United States Patent Office 3,687,628
Patented Aug. 29, 1972

3,687,628
METHOD OF PURIFYING SULFUR FROM ARSENIC
Igor Mikhailovich Nelen, Sadovo-Chernogryazskaya ulitsa 13/3, kv. 69, Moscow, U.S.S.R., and Vladimir Ivanovich Goryachkin, Zheleznodarozhnaya ulitsa 16, poselok Nikolskoe, Moskovskaya oblast, U.S.S.R.
No Drawing. Filed Sept. 11, 1970, Ser. No. 71,341
Int. Cl. C01b 17/14
U.S. Cl. 423—578       4 Claims

ABSTRACT OF THE DISCLOSURE

A method of purifying sulphur from arsenic, according to which molten sulphur is treated with calcium oxide or calcium hydroxide in the presence of a sulphur immiscible phase an aqueous solution of inorganic salts, having a boiling point higher than the melting point of sulphur, the anions of said aqueous solution forming soluble compounds with calcium, said sulfur-immiscible phase preferably wetting any excess solid calcium oxide or hydroxide or the solid calcium reaction product with arsenic.

Said method of purifying sulphur obviates the formation of arseniferous waste solutions, provides for the concentration of arsenic in a solid, compact, dustless product which is convenient for transportation and burial, and requires conventional (non-autoclave) equipment for its realization.

---

The present invention relates to the art of obtaining elemental sulphur, free from admixtures of arsenic, from sulphur-containing materials.

Elemental sulphur is used for producing sulphuric acid, in rubber, pulp and paper industry, in organic synthesis (in the production of sulphur dyes and carbon disulphide, vulcanizing accelerators and pharmaceuticals) and in agriculture. Contamination with arsenic, which is characteristic, particularly, for gas sulphur, involves difficulties in its utilization.

Known in the art are methods of purifying sulphur from arsenic, which are based on the use of calcium oxide or calcium hydroxide.

Thus, for example, a method of purifying sulphur from arsenic is known, according to which molten sulphur is treated with milk of lime in an autoclave, and then washing out the arsenic.

The known method is disadvantageous in the necessity of disposing arseniferous waste liquors (or of their purification for detoxication thereof), and in a relatively complicated equipment required for its realization, since the process is run under pressure.

It is an object of the present invention to provide a method of purifying sulphur from arsenic, which would obviate the formation of arseniferous solutions.

Another object of the invention is to provide a method of purifying sulphur from arsenic, which would require simple equipment for its realization.

In accordance with said and other objects, the method of the present invention resides in that molten sulphur is treated with calcium oxide or hydroxide in the presence of an aqueous solution of inorganic salts, whose boiling point is higher than the melting point of sulphur and whose anions form soluble compounds with calcium cations.

As aqueous solutions of inorganic salts, it is preferable to use aqueous solutions of such compounds as potassium, sodium, calcium, magnesium, barium and ammonium chlorides or nitrates, or their mixtures, as most easily available materials.

The use of an aqueous solution of such compounds is dictated by the fact that for the chemical interactions to take place between the primary compounds of arsenic and lime, which ensure the purification of sulphur, the dissolution of the lime is prerequisite. The compounds do not react directly in molten sulphur.

The formation of insoluble compounds between the anion of the solution and calcium is inadmissible, since lime, as pointed out above, reacts with the primary compounds of arsenic in a dissolved state.

When such an aqueous solution of inorganic salts is introduced into molten sulphur, the solution becomes distributed within the sulphur in the form of drops. Solid components of the melt being treated, that is, excess lime, compounds forming in the course of interaction, including arsenous compounds, and ash admixtures of the initial sulphur, are wetted by said aqueous solution better than by the molten sulphur, and therefore they are accumulated within the drops of said solution due to the action of the surface tension forces.

When treating molten sulphur in the presence of different amounts of an aqueous solution whose boiling point is higher than the melting point of sulphur, arsenous compounds can be isolated in the form of a granulated or paste-like arsenous cake, or as a pulp.

For the arsenous cake to be obtained in the form of solid, strong, spherical granules, the treatment of molten sulphur is recommended to be effected in the presence of 1–15 l. of an aqueous solution of inorganic salts, per kilogram of arsenic impurity, the boiling point of the aqueous solution being higher than the melting point of molten sulphur. The amount of the solution is calculated per kg. of arsenic contained in the sulphur to be purified.

The method of purifying sulphur from arsenic proposed herein offers the following advantages:

(1) The formation of arseniferous solutions is precluded (as arsenic is isolated in the form of a granulated or paste-like cake);

(2) Arsenic is isolated in a compact, dustless product (arsenous cake) which is convenient for transportation and burial;

(3) The method is realized with the use of conventional (non-autoclave) equipment, since the treatment of molten sulphur is effected in the presence of aqueous solutions of boiling point higher than the melting point of sulphur.

When carrying out the process of purifying sulphur with the formation of arsenous cake, the latter is the only by-product resulting when the process is realized in accordance with the present method. All the arsenic isolated from sulphur is concentrated in the cake. The aqueous solution which was present in the molten sulphur during the treatment is incorporated in the cake thus formed.

The present method of purifying sulphur from arsenic is effected as follows.

A vessel equipped with a mixing device is charged with molten sulphur to be purified. Charged into this vessel are also lime which is mixed with the sulphur, and an aqueous solution of inorganic salts. As aqueous solutions of inorganic salts use can be made of, for example, aqueous solutions of nitrites, nitrates, chlorides, bromides, iodides, permanganates, formates, thiosulphates, acetates. Lime can be introduced into molten sulphur in the form of dry calcium oxide or calcium hydroxide (either prior to, or after the introducing of the aqueous solution of inorganic salts into the melt). Besides, lime can be introduced into the melt as a milk of lime, prepared, for example, on the basis of said aqueous solution.

The method is recommended to be carried out with intense stirring and at a temperature of the bath preferably not exceeding 160° C. (since above this temperature the viscosity of sulphur sharply increases).

The aqueous solution of inorganic salts can be introduced into molten sulphur at a required concentration, that is, the boiling point of the solution can be higher than the melting point of sulphur, or the solution can be diluted, and its boiling point can be lower than the melting point of sulphur. In the latter case in the course of mixing of the solution with the melt, the excess water of the solution evaporates to the required concentration. The introducing into the melt of a solution having a reduced boiling point is justified, for example, in case of an excessively high temperature of the initial sulphur and, hence, of an excess heat in the molten bath. At equilibrium the boiling point of the solution is equal to the temperature of the molten sulphur being treated. The temperature conditions of treating sulphur recommended above (114–120° C.) are stipulated by the possibility of using less concentrated solutions. Thus, for example, when use is made of an aqueous solution of calcium chloride, the concentration of salt and the boiling point of the solution are in a relation specified in the table below.

TABLE

| Concentration: | Boiling point, ° C. |
| --- | --- |
| 34.5 | 114 |
| 40 | 119 |
| 41 | 120 |
| 45.8 | 125 |
| 50.2 | 130 |
| 57.9 | 140 |

It is expedient, that the process of purification should be carried out under conditions which ensure the obtaining of arsenous cake in the form of solid granules (the latter being most convenient for transportation and burial or further processing). For this purpose the amount of the aqueous solution having a boiling point higher than the melting point of sulphur, used for treating molten sulphur, should be 1–15 l. per kg. of arsenic contained in the sulphur to be purified. The size of the cake granules is easily controlled to be within 0.5–25 mm. by the intensity of mixing, by appropriate batching of the aqueous solution, by adjusting the duration and temperature of the process. The chemical interaction between the lime and arsenic compounds present in the sulphur being purified and the formation of arsenous cake in the form of solid granules require from 2 to 40 minutes, depending on the process conditions. After the formation of the granules, it is preferred that the bath temperature should be raised from 114–120° C. (the temperature of treating molten sulphur) to 130–150° C. This leads to further strengthening of the formed granules due to partial evaporation of the aqueous solution, and to a reduction in the viscosity of sulphur, which facilitates subsequent separation of the granules and diminishes losses of the sulphur therewith. The granules concentrate the arsenic separated from the sulphur and are, as has been pointed out above, a compact, dustless product, convenient for transportation or burial, or further processing. The sulphur is separated from the arsenous cake by conventional methods such as filtration or centrifugation.

To regenerate the inorganic salts, the granules can be washed with water, and the resulting solution recycled to the initial stage of the process, or for the preparation of the starting aqueous solution of inorganic salts.

In case the amount of the aqueous solution of inorganic salts for treating molten sulphur exceeds the above-specified ratio of 15 l. of the solution per kg. of arsenic arsenous compounds are isolated from the sulphur being purified in the form of a paste-like arsenous cake or pulp. The latter are separated from the purified sulphur by conventional methods, such as filtration or decantation. However, it is not expedient to run the process in this dilution, since the stage of separation of the purified sulphur involves complicated equipment.

The present invention will be more fully appreciated from the following examples of purifying sulphur from arsenic.

EXAMPLE 1

600 g. of gas sulphur are melted in a steel cylinder, the sulphur containing 0.6 wt. percent of arsenic. At a temperature of 116° C. 11 g. of dry calcium oxide are fed into the melt. After keeping at this temperature for 30 minutes and under continuous stirring 25 ml. of 39% aqueous solution of calcium chloride are added thereto (the boiling point of the solution being 118° C.). After that the contents of the cylinder are kept over a period of 1 hour at a temperature of 116° C. and thereupon heated to 130° C. and filtered through a fiberglass on a vacuum filter heated up to the same temperature. The purified sulphur becomes separated from the granules of arsenous cake. The content of arsenic in the filtered-off sulphur amounts to 0.0002 wt. percent. The size of the granules of arsenous cake is within 2 to 10 mm., the content of sulphur therein is 18.0 wt. percent, and that of arsenic is 6.5 wt. percent.

When the granules are washed with a view to regenerating calcium chloride, to the aqueous extract there pass 3.5 wt. percent of the arsenic contained in the granules.

EXAMPLE 2

Into 600 g. of molten sulphur containing 0.6 wt. percent of arsenic at a temperature of 118° C. milk of lime is fed with stirring, this milk of lime having been prepared from 13.5 g. of calcium oxide and 30 ml. of 39% aqueous solution of calcium chloride. After having been kept at said temperature for 20 minutes, the contents of the bath are heated to 135° C., and then filtered. The purified sulphur is separated from the granules of arsenous cake. The filtered sulphur contains 0.001 wt. percent of arsenic, the yield of the sulphur being 97.8 wt. percent of the sulphur charged. The size of the granules of arsenous cake is 4–8 mm., the yield thereof being 10.4 wt. percent of the sulphur charged.

EXAMPLE 3

Charged into 600 g. of molten sulphur containing 0.6 wt. percent of arsenic at a temperature of 132° C. with stirring are 22 ml. of 32% aqueous solution of calcium chloride (the boiling point of the solution is 112° C.); the temperature of the bath is lowered to 116° C. Then 13.5 g. of calcium oxide are charged, the bath is kept, with stirring, at this temperature over a period of 40 minutes, then heated to 130° C. and filtered. The purified sulphur is separated from the granules of arsenous cake. The content of arsenic in the resulting sulphur is 0.002 wt. percent.

EXAMPLE 4

Into a bath equipped with stirrers there are fed 18.8 tons of molten sulphur which features 0.6 wt. percent of arsenic, 0.24% of ash and 0.044% acidity. At the temperature of the bath of 113° C. dry calcium hydroxide is fed thereinto in an amount of 21.1 kg. per ton of sulphur. The contents of the bath are stirred during 5 minutes till a homogeneous mass is obtained, and then 40% aqueous solution of calcium chloride is poured therein in an amount of 29.7 l. per ton of the sulphur (the boiling point of the solution being 119° C.). After half an hour of keeping the bath at the temperature of 113° C. and stirring, the purified sulphur is separated from the granules of arsenous cake by centrifugation.

The purified sulphur contains 0.002 wt. percent of arsenic and features 0.04% ash content and 0.0011% acidity. The yield of sulphur is 98.2% of the weight of the sulphur charged. The yield of the granules of arsenous cake is 9.1 wt. percent of the charged sulphur, the size of the granules is 4–7 mm., the content of arsenic is 6.6 wt. percent.

EXAMPLES 5-16

Into 600 g. of molten sulphur containing 0.6 wt. percent of arsenic 13.5 g. of dry calcium oxide are fed. An aqueous solution of inorganic salts is added in two batches with an interval of 30-40 minutes between the batches, at a temperature of the melt of 114-117° C. After feeding the second batch, the temperature of the melt is raised to 120-125° C. The total duration of the treatment of the sulphur, from the commencement of feeding the first batch of the aqueous solution, is 60 minutes. The purified sulphur is separated from the arsenous cake by filtration. The results of treating sulphur with aqueous solutions of different inorganic salts are tabulated below.

TABLE

| Example No. | Aqueous solution of inorganic salts used | | | Volume of batches fed, ml. | | Content of As in purified sulphur, wt. percent |
|---|---|---|---|---|---|---|
| | Kind of salts | Concentration of salts, wt. percent | Boiling point of solution, °C. | First batch | Second batch | |
| 5 | $MgCl_2$ | 33 | 120 | 10 | 25 | 0.006 |
| 6 | $MgCl_2$ $KCl$ | 29.8 2.7 | 120 | 20 | 25 | 0.02 |
| 7 | $NH_4Cl$ | ca. 45 | 115 | 20 | 18 | 0.04 |
| 8 | $Ca(NO_3)_2$ | 60 | 120 | 19 | 14 | 0.001 |
| 9 | $Mg(NO_3)_2$ | ca. 45 | 120 | 19 | 16 | 0.003 |
| 10 | $KNO_3$ | 75 | 115 | 25 | 25 | 0.0008 |
| 11 | $NaNO_3$ | 68 | 120 | 25 | 25 | 0.0012 |
| 12 | $NH_4NO_3$ | 70 | 120 | 15 | 10 | 0.014 |
| 13 | $KJ$ | 65 | 116 | 20 | 22 | 0.008 |
| 14 | $NaBr$ | 54 | 115 | 20 | 25 | 0.014 |
| 15 | $Na_2S_2O_3$ | 70 | 122 | 15 | 25 | 0.02 |
| 16 | $NaC_2H_3O_2$ | 67 | 125 | 18 | 15 | 0.03 |

What is claimed is:

1. A method for reducing the arsenic content of sulfur which comprises treating molten sulfur at a temperature in the range from the melting point of the sulfur to 160° C. with calcium oxide or calcium hydroxide, in the presence of a sulfur immiscible phase of an aqueous solution of inorganic salts of boiling point higher than the melting point of sulfur, said salts having ions forming soluble compounds with said calcium oxide or calcium hydroxide, until the arsenic impurities form insoluble salts with the calcium said insoluble salts concentrating in said sulfur-immiscible phase; and separating said sulfur-immiscible phase from the molten sulfur.

2. A method as claimed in claim 1 wherein said aqueous solution of inorganic salts is selected from the group consisting of potassium, sodium, calcium, magnesium, barium, ammonium chlorides and nitrates, and mixtures thereof.

3. A method as claimed in claim 1 wherein the sulfur-immiscible phase is initially present to the extent of 1 to 15 liters of said aqueous inorganic salt solution per kilogram of arsenic content of the sulfur being treated.

4. A method as claimed in claim 1 wherein, during the treatment, the temperature of the sulfur phase and the sulfur-immiscible phase is maintained in the range 114° C.-120° C. and the separation of the phases is conducted within the range 130° C.-150° C.

References Cited
UNITED STATES PATENTS

| | | | |
|---|---|---|---|
| 1,970,147 | 8/1934 | Levy | 23—224 |
| 1,727,306 | 9/1929 | Piver | 23—53 |
| 2,156,595 | 5/1939 | Lindblad et al. | 23—53 |
| 3,110,566 | 11/1963 | Giammarco | 23—224 |

FOREIGN PATENTS

| | | | |
|---|---|---|---|
| 733,604 | 11/1953 | Great Britain | 23—229 |

OSCAR R. VERTIZ, Primary Examiner

G. O. PETERS, Assistant Examiner

U.S. Cl. X.R.

423—87